No. 794,747. PATENTED JULY 18, 1905.
C. T. ROWLAND & L. F. LONGMORE.
O. O. GREENWOOD, ADMINISTRATOR OF L. F. LONGMORE, DEC'D.
SEPARATOR.
APPLICATION FILED FEB. 11, 1903. RENEWED NOV. 18, 1904.

4 SHEETS—SHEET 1.

Witnesses.
Kenneth J. F. McKittrick
Anna T. Halloran.

Inventors.
Charles T. Rowland &
Lewis F. Longmore,
By Albert M. Moore,
Their Attorney.

No. 794,747. PATENTED JULY 18, 1905.
C. T. ROWLAND & L. F. LONGMORE.
O. O. GREENWOOD, ADMINISTRATOR OF L. F. LONGMORE, DEC'D.
SEPARATOR.
APPLICATION FILED FEB. 11, 1903. RENEWED NOV. 18, 1904.
4 SHEETS—SHEET 4.
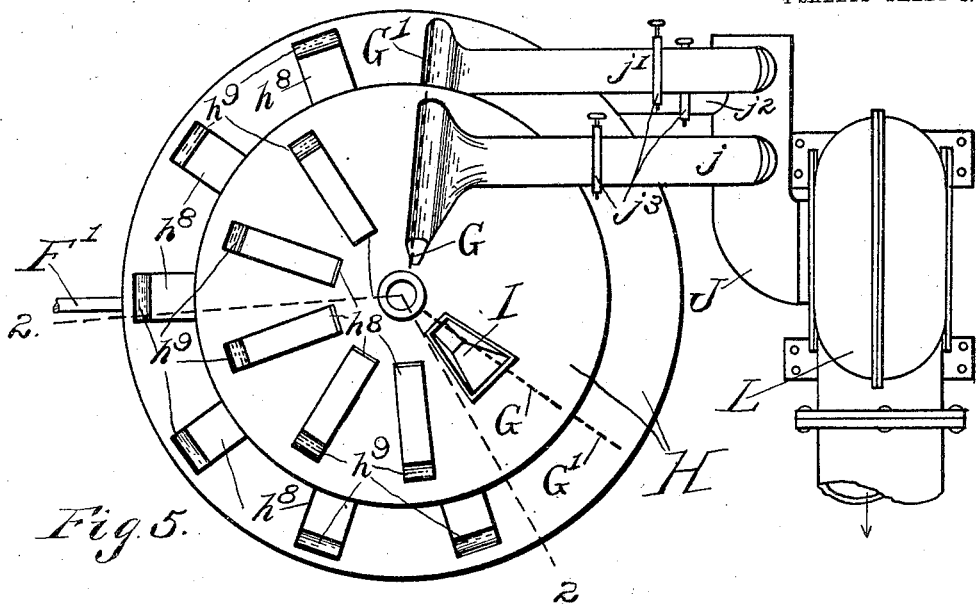
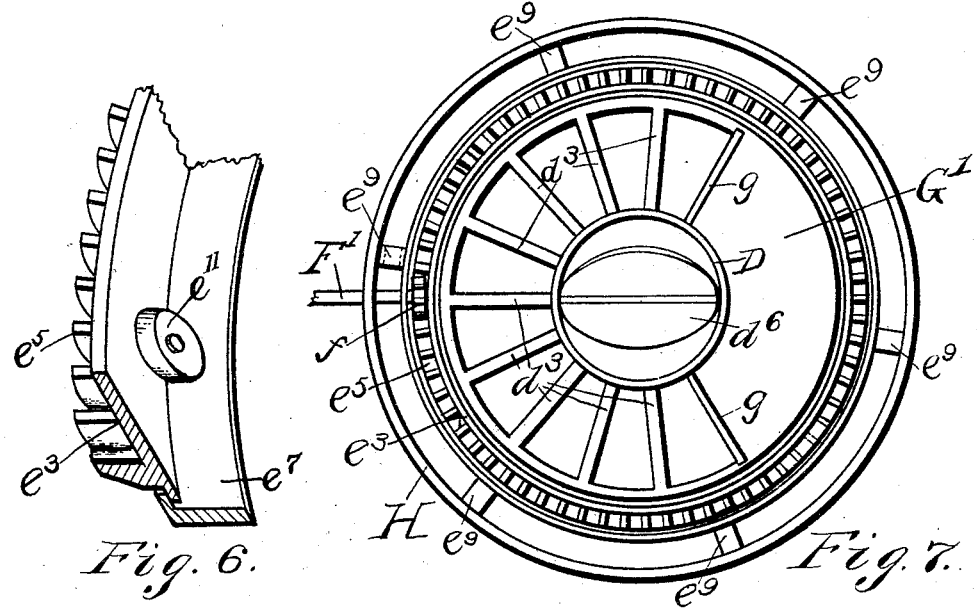
Witnesses
Kenneth J. F. McKittrick
Anna T. Halloran.
Inventors.
Charles T. Rowland &
Lewis F. Longmore,
By Albert M. Moore,
Their Attorney.

No. 794,747.

Patented July 18, 1905.

UNITED STATES PATENT OFFICE.

CHARLES T. ROWLAND AND LEWIS F. LONGMORE, OF LOWELL, MASSACHUSETTS; OTHELLO O. GREENWOOD ADMINISTRATOR OF SAID LEWIS F. LONGMORE, DECEASED; SAID ADMINISTRATOR ASSIGNOR TO SAID ROWLAND.

SEPARATOR.

SPECIFICATION forming part of Letters Patent No. 794,747, dated July 18, 1905.

Application filed February 11, 1903. Renewed November 18, 1904. Serial No. 233,381.

*To all whom it may concern:*

Be it known that we, CHARLES T. ROWLAND and LEWIS F. LONGMORE, citizens of the United States, residing in Lowell, in the county of Middlesex and Commonwealth of Massachusetts, have invented a certain new and useful Improvement in Separators, of which the following is a specification.

This invention relates to separators, and is applicable to machines for separating pulverized and granulated materials from dust and heavier materials or materials which owing to their shape are less easily moved by a current of air—as, for instance, machines for separating grain from dust or graphite from crushed rock.

Said invention comprises means for sucking the unseparated material against a revolving upright conical screen to draw the dust through the perforations of the screen, allowing the parts which fall most readily to drop into a suitable receptacle, while the remaining material too coarse to pass through the screen is held against the screen until at a certain point the inward suction is cut off and the material remaining on the outer surface of the screen is drawn from the screen by outward suction and conveyed by a pipe to a suitable receptacle. Means are provided whereby the inward suction while the screen is revolving and before the material thereon reaches the cutting-off point is retarded intermittently, allowing the material to slide down the cone for a short distance and loosening the heavier materials and dust therefrom.

This invention consists in the combinations and devices hereinafter described and claimed.

Figure 1:
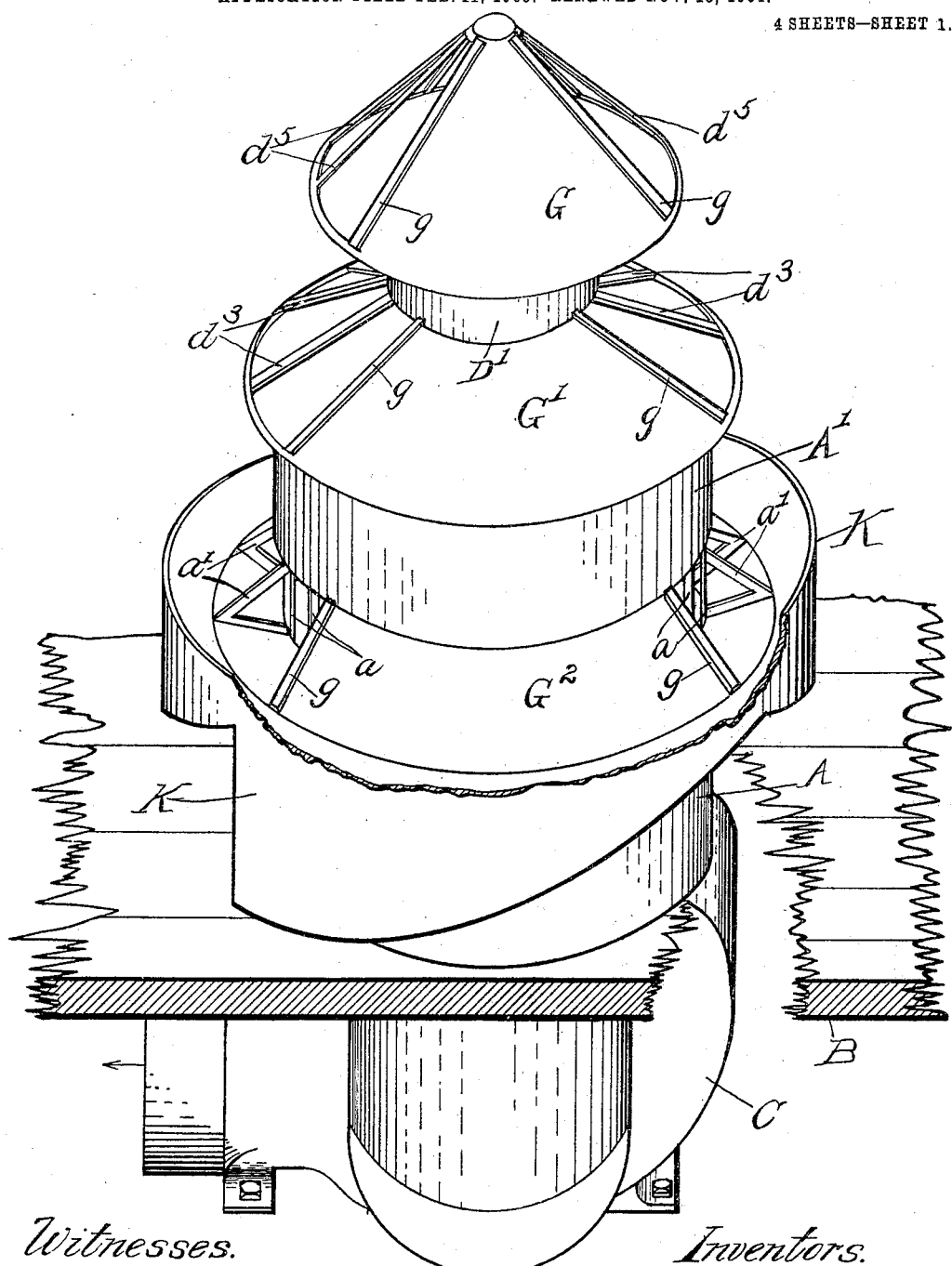
Figure 2:
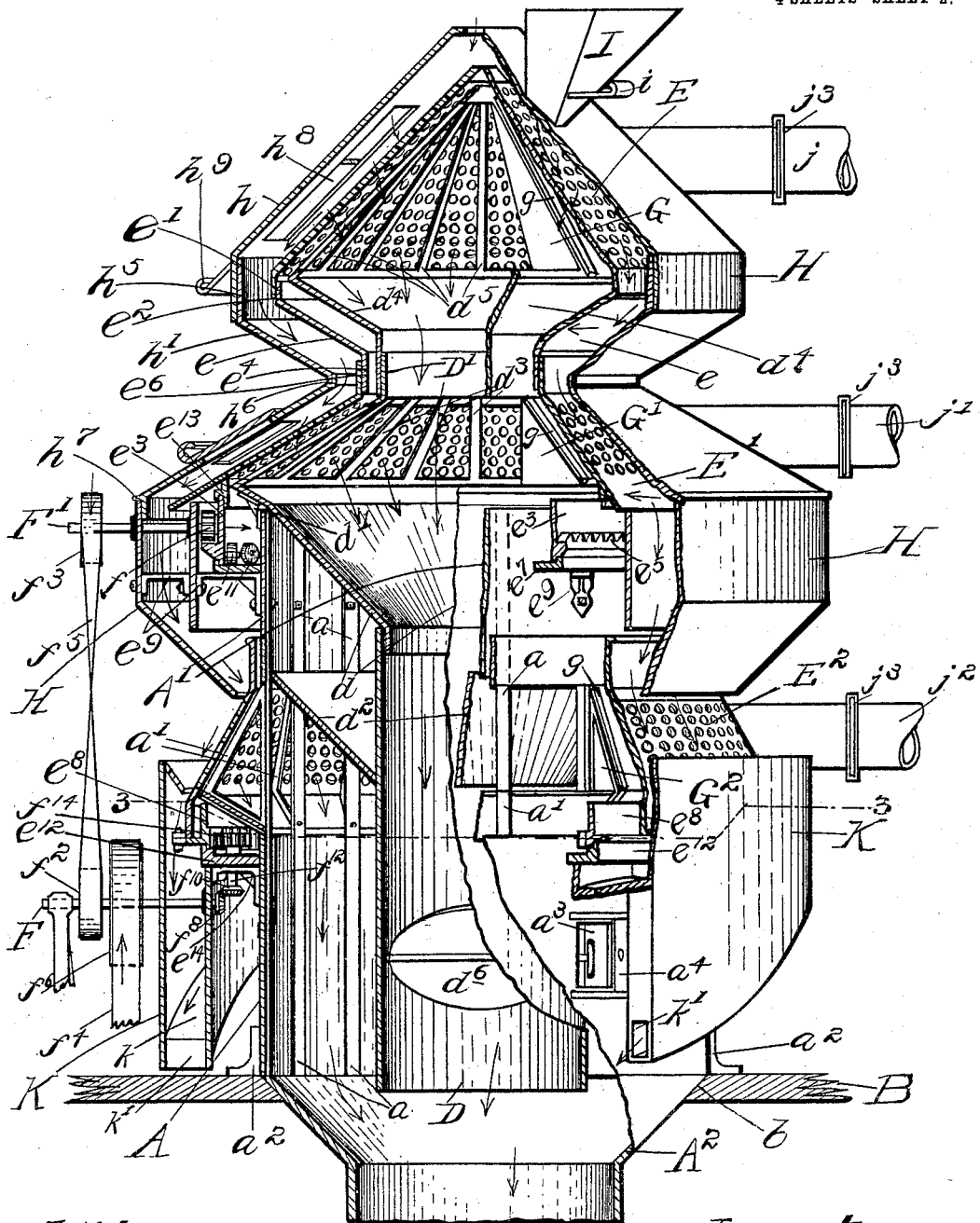
Figure 3:
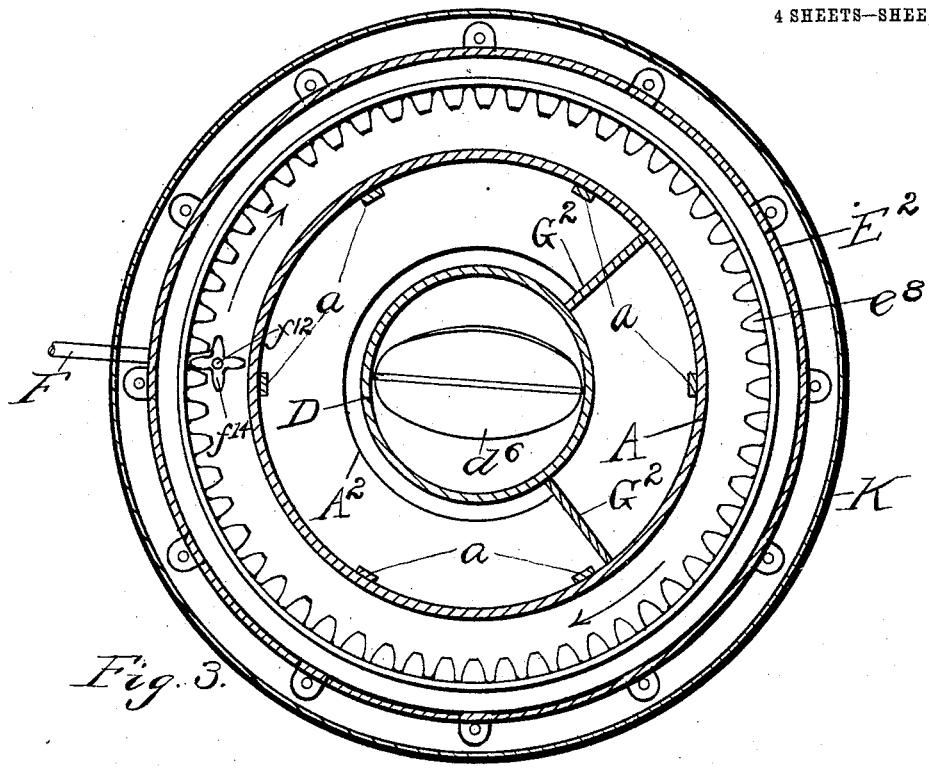
Figure 4:
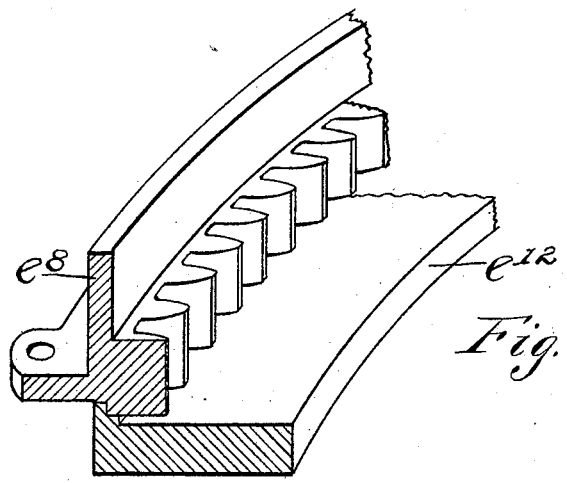

In the accompanying drawings, on four sheets, Figure 1 is a side elevation of the stationary parts of a machine embodying our invention, omitting the casing and the hopper; Fig. 2, a front elevation of said machine with the casing, cages, and air-shafts in section on the line 2 2 in Fig. 5; Fig. 3, a horizontal section on the line 3 3 in Fig. 2; Fig. 4, an isometric perspective view of a portion of the base-ring of the lower conical screen and its annular support; Fig. 5, a plan of the machine; Fig. 6, a perspective view of the base-ring of the intermediate screen and its annular support and one of the screen-supporting wheels; Fig. 7, a plan of the parts below the intermediate screen.

The frame, Figs. 1 and 2, comprises vertical rods $a\ a$, arranged at suitable equal intervals, preferably in a circle, about an opening $b$ of corresponding shape in the floor B or platform on which the machine stands. To the rods $a$ are secured upper and lower tubular sections A A', and in the interval between said sections A A' are bolted or otherwise secured triangular brackets $a'$, which stiffen the rods between said sections and serve to interrupt the inward suction through the lower screen $E^2$ momentarily, as hereinafter explained. Other brackets $a^2$, rigidly fastened to the outside of the lower end of the lower section A, rest upon the floor B and serve as feet. The frame, including the tube-sections, constitutes an air-shaft, through which air entering between the brackets $a^2$ and rods $a$ may be drawn down through the pipe $A^2$, which fills the floor-opening $b$, by a suction-fan C of any ordinary construction. (Shown in Fig. 1.) Another smaller vertical air-shaft D is arranged concentrically with the tube-sections and may be supported by its flaring upper end portion $d$ resting upon brackets $d'$, connecting the outer surfaces of the tube-section A' and portion $d$ and retained in position concentrically with the tubes A A' by an upwardly-flaring flange $d^2$, which reaches across the annular space between the shaft D and the upper tube A, so that a dead-air space is inclosed between said shaft and tube and between said flange $d^2$ and the flaring upper part $d$ of the inner air-shaft.

Upon the upper end $d$ of the shaft D are secured inwardly-inclined struts $d^3$, which serve as interrupters for the intermediate screen E', and on these struts or interrupters is secured another air-shaft section D', (represented as of the same diameter as the cylindrical part of the shaft D and concentric therewith.) On the top of the shaft-section D' is removably secured an inverted hollow cone $d^4$, on which are secured other inwardly-inclined struts $d^5$, which serve as interrupters for the screen E'.

The upper conical screen E is arranged over the struts $d^5$, which serve as interrupters therefor, and is secured to a base-piece $e$ of the shape of a frustum of a cone, having annular flanges $e^2$ $e^4$, which fit and are held to corresponding flanges $e'$ $e^6$ on the screen E and on a similar larger intermediate screen E', as shown in Fig. 2, so that said upper screen E will be revolved by the revolution of the next lower screen E'. The screen E' is provided with a pendent annular flange or base-ring $e^3$, provided with an annular rack or gear $e^5$, as shown in Figs. 1 and 6, which rests upon a horizontal annular track or support $e^7$, rigidly secured to the outside of the tube-section A, as by brackets $e^9$, the base-ring being preferably provided with antifriction-wheels $e^{11}$. The intermediate screen E' is rotated, carrying with it the upper screen E, by a pinion $f$ engaging the rack or gear $e^5$ and fast on the shaft F', a fast pulley $f^3$ on said shaft being connected by a belt $f^5$ to another pulley $f^2$, fast on the shaft F, which is driven by a belt $f^4$, which connects any suitable motor (not shown) to another pulley $f^6$, fast on said shaft F. The lowest screen $E^2$, also conical, is provided with a base-ring $e^8$, having an annular track $e^{12}$, supported on brackets $e^{14}$ on the side of the tube-section A. A bevel-gear $f^8$, fast on the shaft F, engages a bevel-gear $f^{10}$ on the vertical counter-shaft $f^{12}$, and said counter-shaft runs up through the track $e^{12}$ and carries a pinion $f^{14}$, which engages said rack $e^5$ and rotates the lowest screen $E^2$.

The interrupters $a'$ $d^3$ $d^5$, above mentioned for each screen E E' $E^2$, are arranged within said screen in close proximity to its inner surface, but out of contact therewith, and reach from top to bottom of the screen-surface and serve momentarily to interrupt the current passing in through the screen, thus allowing the material on the screen to slide down a short distance on the screen and the particles of material to become released from each other, enabling the dust to pass through the screen, but catching the particles intended to be retained on the screen before they reach the bottom of said screen.

Within each screen E E' $E^2$ a cut-off G G' $G^2$, Figs. 1 and 2, is arranged, the same being a sheet of metal bent parallel to the conical screen and supported upon the interrupters $d^5$ $d^3$ $a'$ and extending through an arc of about one hundred and twenty degrees, (120°,) more or less. At the margins of the cut-offs are arranged strips or packings $g$ $g$, of felt or similar material, which fill the spaces between said cut-offs and screens and prevent the air passing over the edges of the cut-off and also to brush off the inside of the screen and keep the perforations open. Through the part of a screen which is immediately over a cut-off the suction is too slight to retain the material on the inclined side of the screen.

The upper and intermediate screens E E' are inclosed in a casing H, represented as formed in four parts $h$ $h'$ $h^2$ $h^3$, which for convenience may be separable, being provided with annular flanges at $h^5$ $h^6$ $h^7$, which enter and receive each other, said parts being shaped into parallelism with the screens and flaring portions $d^2$ $d^4$ of the air-shafts to form a continuous passage from the screen E to and past the screen E' and to the screen $E^2$. The screen-covering part $h$ supports a hopper I, into which the materials to be separated are introduced, the hopper opening through said part. The hopper is provided with a slide $i$, by which said hopper may be closed or the amount of delivery therefrom regulated and may be supplied in any usual manner, as by hand or by a feed-trunk. The hopper I, Fig. 2, is arranged to deliver the material on the part of the screen which has just left the cut-off near the top of said screen.

The take-off suction-pipe J (see Figs. 2 and 5) is provided with branches $j$ $j'$ $j^2$, each arranged to take the material which adheres to a screen just as the material reaches the cut-off—that is, just before it would otherwise drop from the screen. The pipe J is exhausted by any convenient means, as by a suction-fan, (indicated at L in Fig. 5,) and a current of air in each branch is controlled by a separate damper $j^5$.

Both of the screen-covering parts $h$ $h^2$ are provided with air-openings $h^8$, controlled by sliding covers $h^9$, by which the amount of air admitted to the machine may be regulated.

The passage of air through the air-shaft D is regulated and controlled by a damper $d^6$ of ordinary construction, the handle of which is reached by an opening $a^3$ in the tube A, which opening is closed normally by a sliding door $a^4$.

To facilitate the removal of the upper parts of the machine, the base-ring $e^3$ may have a removable upper section $e^{13}$, which takes off with the intermediate screen E', leaving the body of said base-ring in position.

The material from the lower screen $E^2$ falls into the annular troughs K, which are provided with inclined bottoms $k$ and discharge-openings $k'$, from which the sand falls and may enter any suitable bin or receptacle. The troughs K may be supported by the same brackets $e^{14}$ which support the track $e^{12}$, Fig. 2, connecting them to the shaft or tube-section A'.

The action of the three superposed sieves is similar upon the material which falls upon their surfaces. This separator is specially constructed for separating graphite from the sand and other similar rubbish mixed with it; but it may be used to separate other substances. The crushed graphite-bearing rock is fed onto the inclined surface of the top sieve in such a manner that it forms a thin even layer upon the sieve or screen. The surface of the screen is arranged at such an angle as will cause the material to slide slowly by gravity over its surface. The current of air which is drawn downward through the screen holds the thin layer of material upon its surface and normally prevents it from sliding. This air-current is interrupted or retarded at certain parts of the screen for short periods of time by the interrupters or interrupting-bars, and the material slides step by step upon the screen during the short periods when the air-current is interrupted. The sand, which is granular in structure, slides more freely than the pure graphite, which is of a more flaky nature, and a gradual separation of the sand from the pure graphite is effected upon the surface of the screen, every part of the screen being subjected to the downward intermittent air-current successively. The pure graphite remains upon the screen until the downward air-current is wholly cut off by the cut-off plate. At this point the pure graphite is removed from the surface of the screen by the air-current of the suction-fan or other similar device, the air-pipe of which is connected to the air-space above the screen vertically over one end portion of the cut-off plate, and the pure graphite is deposited in a suitable receptacle. The packings at the edges of the cut-off plate rub against the under side of the screen and brush out any material which might otherwise stick in its interstices, so that a free passage for the downward air-current is at all times provided through the screen. The screen is formed of a foraminous plate or sheet of any suitable material, and its numerous very small openings are intended for the passage of air and not for the purpose of separating one material from the other.

What we claim is—

1. The combination, with an inclined foraminous plate for supporting the material, of means for drawing a current of air downwardly and intermittently through the said plate, whereby the material on the plate is permitted to slide step by step upon its surface.

2. The combination, with an inclined foraminous plate for supporting the material, of means for drawing a current of air downwardly through the said plate, and means for interrupting or retarding the said air-current periodically at certain parts of the said plate to permit the material to slide over its surface step by step.

3. The combination, with an inclined foraminous plate for supporting the material, of means for drawing a current of air downwardly and intermittently through the said plate, whereby the material is permitted to slide step by step upon its surface, and means for subsequently cutting off the air-current from a certain part of the said plate to permit of the removal of the pure material from its surface.

4. The combination, with an inclined foraminous plate for supporting the material, of means for drawing a current of air downwardly through the said plate, a series of air interrupters or retarders arranged under the said plate, and means for bringing all parts of the said plate successively over the said interrupters to permit the material to slide step by step upon its surface.

5. The combination, with a conical foraminous plate for supporting the material, of means for drawing a current of air downwardly through the said plate, a series of air interrupters or retarders arranged under the said plate, and driving devices for revolving the said plate.

6. The combination, with a conical foraminous plate for supporting the material, of means for drawing a current of air downwardly through the said plate, a series of air interrupters or retarders arranged under the said plate and permitting the material to slide step by step, an air-cut-off plate also arranged under the said conical plate to permit of the removal of pure material from its surface, and driving devices for revolving the said conical plate.

7. The combination, with a casing, a conical foraminous plate inclosed in the said casing, and driving mechanism for revolving the said plate; of means for drawing a current of air downward through the said plate, a series of air interrupters or retarders arranged under the said plate, an air-cut-off plate also arranged under the said conical plate, an air-pipe secured to the said casing above the said conical plate and vertically over the said cut-off plate, and means for drawing a current of air through the said pipe to remove the pure material.

8. The combination, with a casing having air-inlets at its top, a conical foraminous plate inclosed in the said casing, and driving mechanism for revolving the said plate, of means for drawing a current of air downward through the said plate, a series of air interrupters or retarders arranged under the said plate, an air-cut-off plate also arranged under the said conical plate, an air-pipe secured to the said casing and arranged vertically over one end portion of the said cut-off plate, means for drawing a current of air through the said pipe to remove the pure material, and a hopper or chute for discharging impure material onto the upper part of the said conical plate at a point adjacent to the other end portion of the said cut-off plate.

9. The combination of a conical screen having a vertical axis, means for rotating said screen about said axis, means for creating a suction inwardly through said screen and means for cutting off said suction from each part of said screen successively during each rotation of said screen.

10. The combination of a conical screen having a vertical axis, means for rotating said screen about said axis, means for creating a suction inwardly through said screen and means for momentarily interrupting said suction.

11. The combination of a conical screen having a vertical axis and a base, provided with an annular rack or gear, a pinion engaging said rack or gear, means for rotating said pinion, to turn said screen about its axis, means for supporting said screen, means for creating a suction inwardly through said screen, means for cutting off said suction from each part of said screen successively during a part of each revolution of said screen and means of creating an outward suction at the beginning of said cut-off.

12. The combination of a tubular casing or air-shaft, an annular air-inlet, means of exhausting the air from said shaft, an annular bracket or supporting-ring secured on said casing, a conical screen supported on said bracket or ring, means for rotating the same about its vertical axis, stationary brackets arranged vertically across said inlet at equal intervals and in proximity to the inner surface of said screen to interrupt the suction through said screen.

13. The combination of concentric tubular air-shafts arranged one within the other, the outer shaft having an annular opening, the annular space between said shafts above said opening being closed to form a dead-air space, means for exhausting the air from said shafts, a conical screen arranged around the opening in said outer shaft, the inner shaft provided with a flaring top and another conical screen arranged over said flaring top and means for rotating said screens about their vertical axes.

14. The combination of concentric tubular air-shafts arranged one within the other, the outer shaft having an annular opening, the annular space between said shafts above said opening being closed to form a dead-air space, means for exhausting the air from said shafts, a conical screen arranged around the opening in said outer shaft, the inner shaft provided with a flaring top and another conical screen arranged over said flaring top, struts or supports arranged on said flaring top and another shaft-section supported on said struts or supports and having a flaring upper end and a third conical screen arranged above said last-named shaft-section and means for rotating all said screens.

15. The combination of two or more conical screens arranged one above another and having concentric vertical axes, tubular air-passages from each screen to the one next below, a suitable casing surrounding the upper screens and extending to the lowest screen, means of creating an inward suction through the screens above the lowest, separate means of creating an inward suction through the lowest screen, and means of supplying material to the uppermost screen.

In testimony whereof we have affixed our signatures in presence of two witnesses.

CHARLES T. ROWLAND.
LEWIS F. LONGMORE.

Witnesses:
   ALBERT M. MOORE,
   ANNA T. HALLORAN.